July 30, 1968  T. J. CARSKI ETAL  3,394,846
SENSITIVITY DISC DISPENSER
Filed Feb. 16, 1967
4 Sheets-Sheet 1
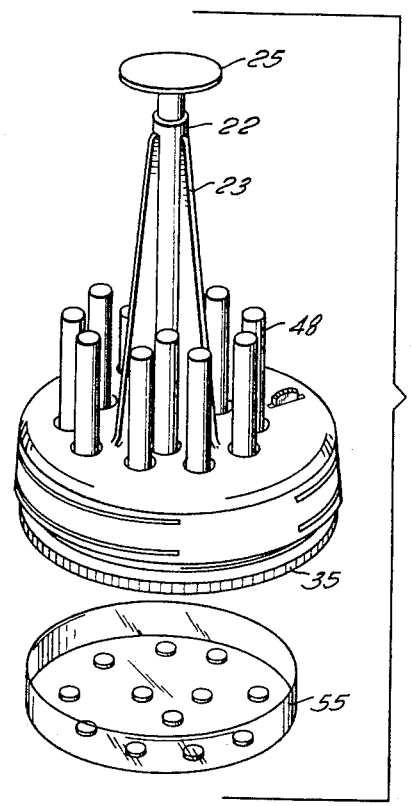
FIG. 1
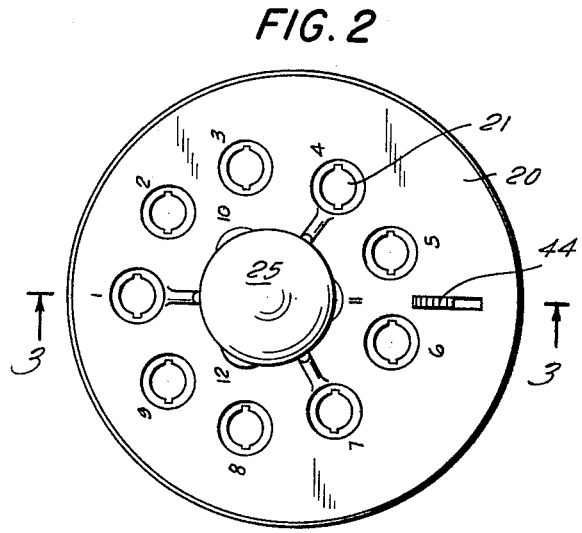
FIG. 2
FIG. 9
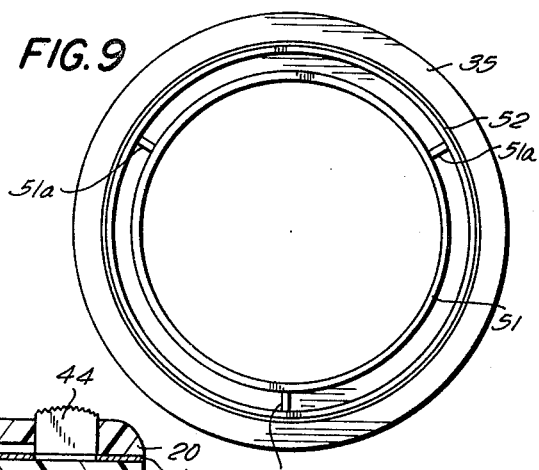
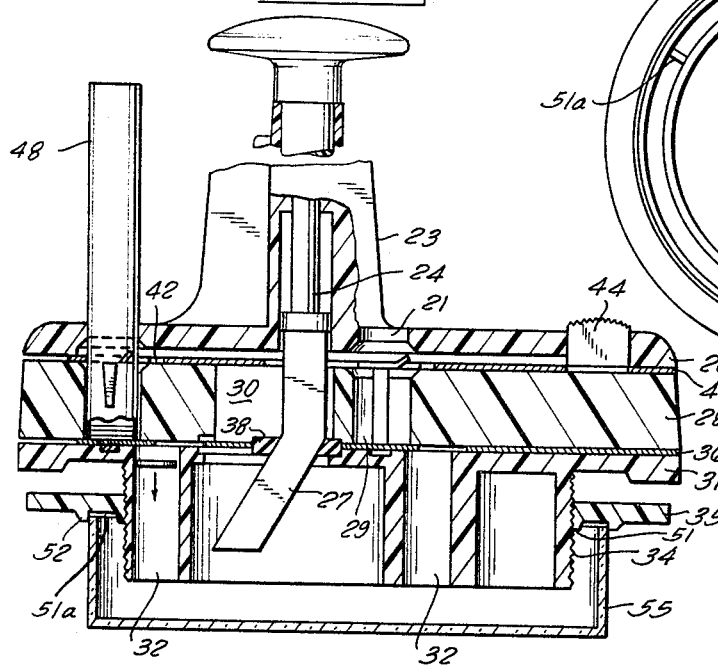
FIG. 4
INVENTORS
THEODORE J. CARSKI
JOHN LESTER HYNES, JR.
BY
Kane, Dalsimer, Kane, Sullivan and Smith
ATTORNEYS

INVENTOR
THEODORE J. CARSKI
JOHN LESTER HYNES, JR.
BY
ATTORNEYS

July 30, 1968  T. J. CARSKI ET AL  3,394,846
SENSITIVITY DISC DISPENSER
Filed Feb. 16, 1967  4 Sheets-Sheet 4
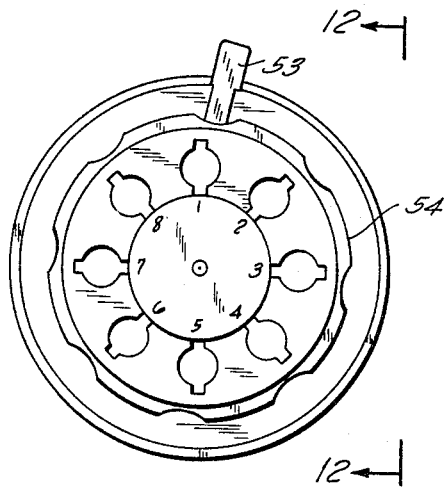
FIG. 10
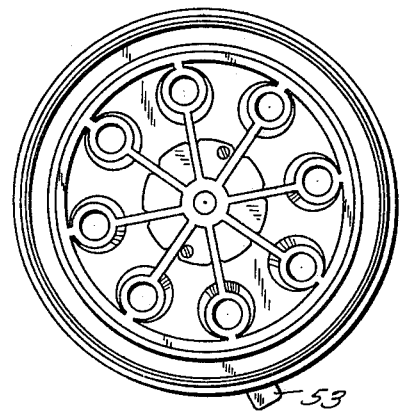
FIG. 11
FIG. 12
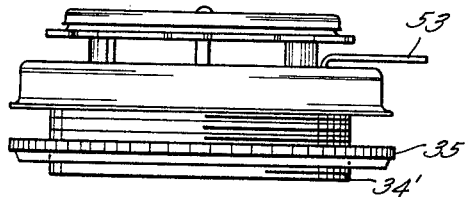
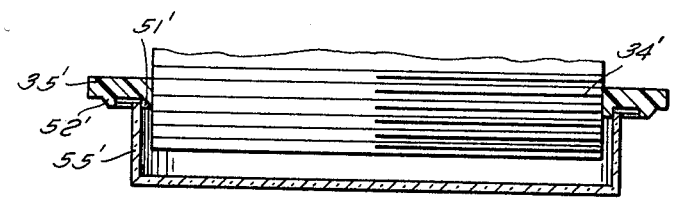
FIG. 13
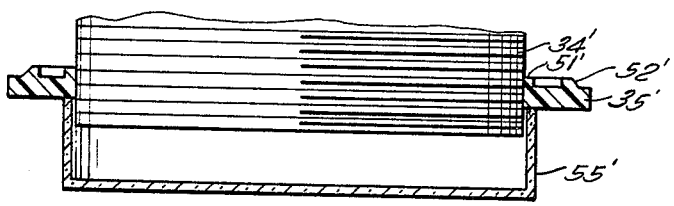
FIG. 14
INVENTORS
THEODORE J. CARSKI
JOHN LESTER HYNES, JR.
BY
Kane Dalsimer, Kane, Sullivan & Smith
ATTORNEYS United States Patent Office

3,394,846
Patented July 30, 1968

3,394,846
SENSITIVITY DISC DISPENSER
Theodore J. Carski and John Lester Hynes, Jr., Baltimore, Md., assignors to Baltimore Biological Laboratory, Inc., Baltimore, Md., a corporation of Maryland
Filed Feb. 16, 1967, Ser. No. 616,613
20 Claims. (Cl. 221—93)

ABSTRACT OF THE DISCLOSURE

An improved sensitivity disc dispenser having a cylindrical extension depending therefrom with a plurality of holes in the extension aligned with the holes in the dispenser to guide a layer of dispensed disc in a substantially accurate pattern into a receiving dish which contains a culture medium. An adjusting ring is movably exteriorly on the extension so that it may be vertically adjusted. When the adjusting ring is rested on the rim of the receiving dish the distance between the bottom surface of the extension and the culture medium in the dish can be controlled to aid in obtaining an accurate pattern of dispensed discs. One of the embodiments discloses a vertical plunger and cam system to dispense a layer of discs. The plunger is depressed a predetermined distance and a layer of discs is dispensed and then when the plunger is released it will automatically return to its original starting position where it is ready for the next dispensing operation.

Background of the invention

This invention relates to an apparatus for simultaneously dispensing a plurality of sensitivity discs, used for laboratory tests, in an accurate pattern and location within a petri dish or similar container.

During the laboratory study of certain cultures, growths, specimens and the like, which are often contained in a petri dish or a similar open dish-like holder, it is sometimes desirable to test different areas on the surface of the culture by using sensitivity discs. However, these discs are light in weight and will generally float in the air and not land in the intended area when dropped from too great a height.

Culture mediums vary in depth within a given petri dish and various size dishes are often employed. Therefore, a dispenser is desirable which will fit all size dishes notwithstanding the various depths of culture while accurately directing the trajectory of fall of the discs.

Also, it is often desirable to have a multiplicity of sensitivity discs dispensed substantially simultaneously to contact the culture in exact spacing for accuracy in test results and provide improved apparatus for accomplishing this end.

Often an operator has only one free hand to operate the dispenser, the other hand being occupied with another task. Under such circumstances, a dispensing mechanism that may be quickly and efficiently operated with one hand would be advantageous.

Summary of the invention

In carrying out the present invention, a dispenser is contemplated which has a cylindrical extension extending from its bottom surface. The extension has a plurality of holes, each of which is aligned with a discharge port of the dispenser so that each dispensed disc from the dispenser may be guided in its free fall to more accurately determine its landing position. An adjusting ring is movably exteriorly on the extension so that it may be adjusted vertically. The surface of the adjusting ring will rest on the rim of a petri dish or similar container and will support the dispenser and extension in the selected position relative to the dish. Therefore, by regulating the vertical height of the adjusting ring in respect to the extension, the distance between the bottom surface of the extension and the culture medium in the petri dish may be kept at a minimum thereby limiting the free fall distance of the discs from the time they leave the extension until they contact the culture medium. The result is less danger that the discs will float in the air and land in an irregular and undesired pattern. In addition, the adjusting ring and extension combination also serve to center the extension within the petri dish thereby helping to more accurately determine the pattern of discs which fall on a culture medium within the petri dish.

Also, in one embodiment of the invention, a vertical plunger and cam system is provided to dispense a layer of discs. The operator need only use one hand to depress the plunger a predetermined distance and a layer of disc will consequently be substantially simultaneously dispensed. When he releases the plunger it will return to the original starting position where it is ready for the next dispensing operation. With the upstanding plunger embodiment, the plunger makes a convenient carrying handle for the dispenser during laboratory use and up to twelve or as many as twelve discs at a time may be dispensed.

It is an object of this invention to provide a sensitivity disc dispenser which will eliminate the above mentioned disadvantages and satisfy the above mentioned requirements and which has; means which will enable the dispenser to be centrally located on any size petri dish or container, and means which will permit the discharge ports of the dispenser to be adjusted to the correct height above the culture medium so that vertically discharged discs can be accurately dropped onto a culture medium.

Another object of this invention is to provide a dispensing mechanism which will simultaneously dispense a multiplicity of discs onto a medium with their centers spaced apart an accepted distance, thereby producing a desirable pattern of discs which enables the user to obtain better test results.

Another object of this invention is to provide a dispensing apparatus which will be centered within the particular petri dish into which it is placed and after efficient and discretionary height adjustment by the operator, will accurately vertically dispense the sensitivity discs in the desired pattern. In order to execute the dispensing operation, the operator need only rotate a dispensing lever a predetermined distance or alternatively in another embodiment depress an upstanding plunger with one hand a predetermined distance. In either alternative, the dispensing mechanism is moved a certain distance and when released will automatically return to its starting position where it will remain until a new layer of discs is to be dispensed.

A further object of this invention is to provide a multiple disc dispenser which may be operated by the use of only one hand thereby freeing the operator's other hand for performing other useful tasks, and in the embodiment having the upstanding plunger for a dispensing mechanism, the plunger and its support may be used as a convenient carrying handle to transport the dispenser. A dispenser is also provided which may be used quickly and efficiently and which may be sterilized and resterilized for repeated use. A container may be provided to house the dispenser and the combined dispenser and container may be sterilized.

Other objects and advantages will become apparent from the following detailed description which is to be taken in conjunction with the accompanying drawings illustrating several preferred embodiments of this invention.

Brief description of the drawings

FIG. 1 is a perspective view of a sensitivity disc dispenser embodying this invention containing a plurality of disc containing cartridges and showing a petri dish associated therewith having had a pattern of discs dispensed thereon;

FIG. 2 is a top view thereof;

FIG. 4 is a fragmentary sectional elevation view of the apparatus shown in FIG. 3 with a disc having been dispensed;

FIG. 9 is a bottom plan view of an adjusting ring of the elevation adjusting mechanism of the sensitivity disc dispenser;

FIG. 10 is a top plan view of an alternate embodiment of a sensitivity disc dispenser embodying this invention;

FIG. 11 is a bottom view thereof;

FIG. 12 is a side elevation view thereof looking in the direction of the arrows extending from line 12—12 of FIG. 10;

FIG. 13 is a fragmentary sectional elevation view thereof showing the adjusting ring associated with a specimen dish; and FIG. 14 is a fragmentary sectional elevation view of this sensitivity disc dispenser showing another suggested arrangement of adjusting ring and specimen dish.

*Description of the preferred embodiments*

Figure 3:
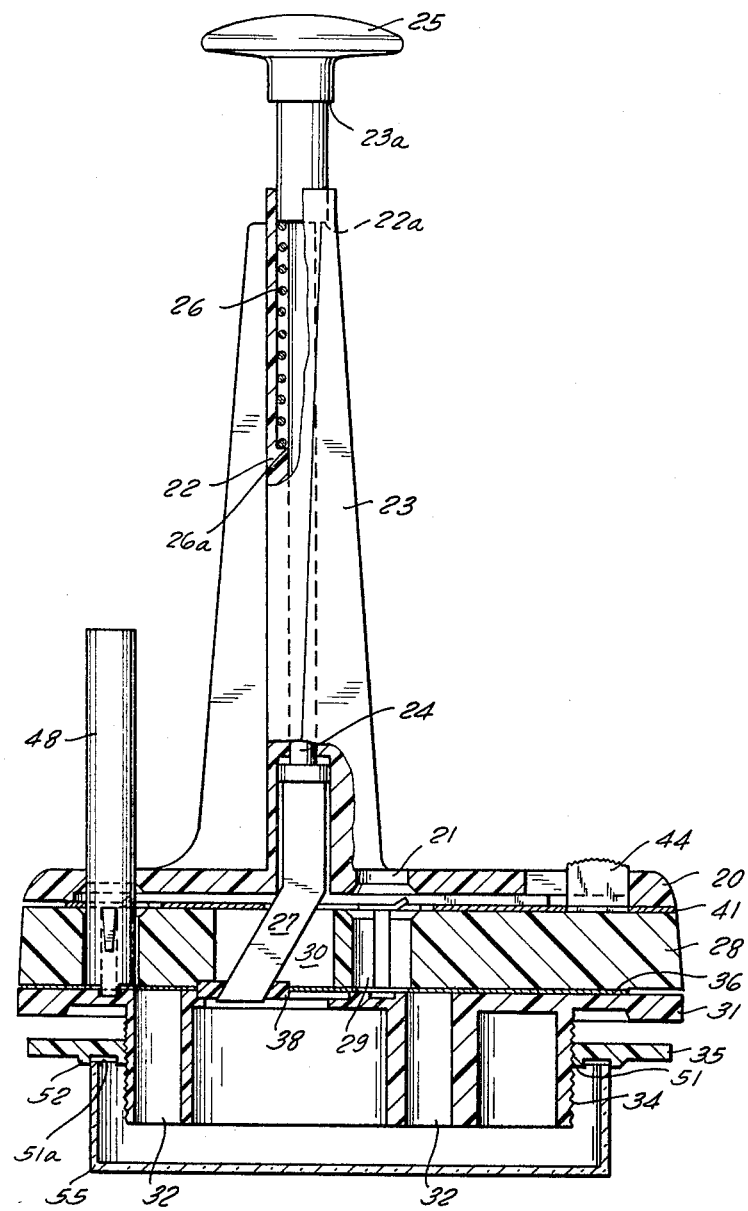
FIG. 3 is a partially sectional elevation view thereof taken along the plane of line 3—3 of FIG. 2 showing the dispenser positioned prior to dispensing.
Figure 5:
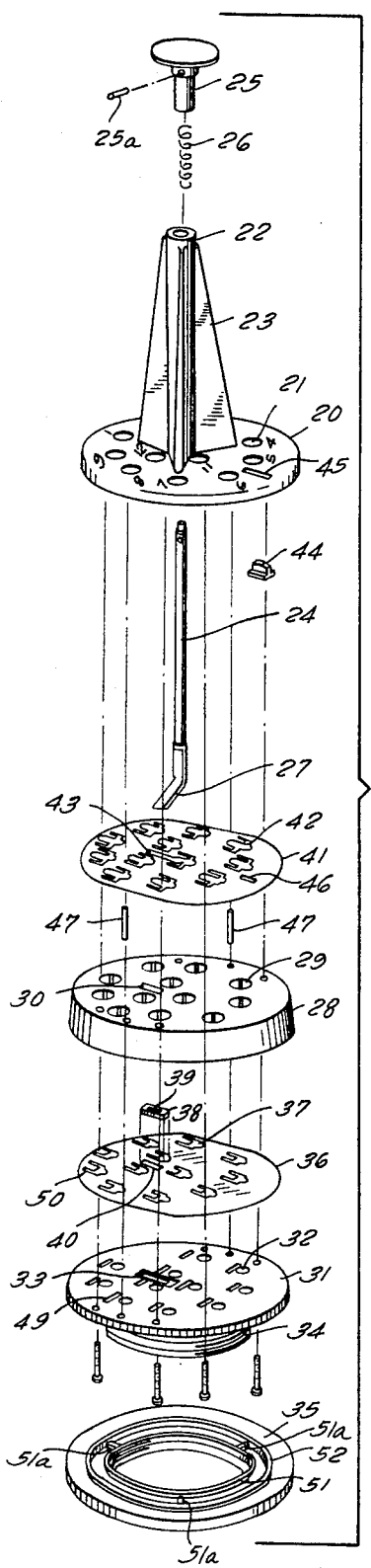
FIG. 5 is an exploded view of the sensitivity disc dispenser of the previous embodiment.

Reference is initially made to the embodiment of FIGS. 1–9. A top plate 20 is provided with a plurality of openings 21. A vertical tubular hollow support 22 extends from the upper surface of top plate 20. Several supporting members 23 add rigidity and strength to support 22 and help to maintain it in an erect position. A cam rod 24 is slidably housed within support 22 and extends from its upper and lower ends. A knob 25 is mounted on the upper end of cam rod 24 and is fastened to cam rod 24 by means of pin 25a. The bottom surface 23a of knob 25 engages with and helps to retain spring 26, which surrounds cam rod 24, within support 22. Spring 26 rests on shoulder 26a within support 22 and biases cam rod 24 and knob 25 in an upward direction. Cam rod 24 is restrained from being forced out of support 22 in an upward direction by spring 26 because of its laterally extending rigid lower end 27.

A center member 28 is provided with a plurality of openings 29 which are substantially equal in size to openings 21 of top plate 20 and positioned so that they will be substantially aligned with openings 21 when center member 28 is fastened to top plate 20. A slot 30 is provided to allow lower end 27 of cam rod 24 to extend through center member 28.

A bottom plate 31 is provided and has a plurality of holes 32 which are equal in number to openings 29 and openings 21 but are not necessarily of the same size and do not align themselves with openings 29 and openings 21 when bottom plate 31 is fastened to center member 28. A slot 33 extends through bottom plate 31 to allow passage of the lower end 27 of cam rod 24.

A tubular extension 34 extends from the bottom surface of bottom plate 31 and has a threaded outer surface. An adjusting ring 35 with a threaded inner surface is mounted on tubular extension 34. The amount tubular extension 34 extends below adjusting ring 35 depends upon the threaded position of adjusting ring 35.

A dispensing plate 36 is mounted between bottom plate 34 and center member 28 in a manner which will permit it to be shifted a predetermined distance. Dispensing plate 36 has a plurality of holes 37 which align themselves with holes 32 in bottom plate 31 when dispensing plate 36 is displaced to one extremity.

A rectangular cam slide 38 is provided and has a rectangular passageway 39 through which passes lower end 27 of cam rod 24. The two shorter sides of passageway 39 are formed at an angle approximating the angle of lower end 27 thereby facilitating the movement of lower end 27 through cam slide 38. Vertical movement of cam rod 24 causes cam slide 38 to follow and move in a horizontal direction thereby transforming the vertical motion of cam rod 24 to the horizontal motion of cam slide 38. The displacement of cam slide 38 is limited to a displacement equal to the distance between the lower and upper tips of lower portion 27. Bottom plate 31 and center member 28 have corresponding rectangular recesses on their adjacent surfaces which combine to form a housing for cam slide 38. The shorter sides of these recesses are substantially equal in width to the shorter sides of cam slide 38 and the longer sides of these recesses are of predetermined length as to allow the required displacement of cam slide 38 in a horizontal direction. Dispensing plate 36 which is slidably mounted between center portion 28 and bottom plate 31 has a rectangular opening 40 which is approximately equal in size to cam slide 38. Cam slide 38 will be held in position within opening 40 in dispensing plate 36 when center portion 28 and bottom plate 31 are fastened together and the movement of dispensing plate 36 will be limited to the displacement distance of cam slide 38. Therefore, when cam slide 38 is displaced in a horizontal direction it will correspondingly displace dispensing plate 36 the same distance in a horizontal direction.

A lock plate 41 is slidably mounted between top plate 20 and center member 28, has a plurality of openings 42 which correspond to openings 21 in top plate 20 and openings 29 in center member 28 and has a slot 43 to allow passage of cam rod 24. The displacement of lock plate 41 is controlled by means of thumb lock 44 which has an upstanding portion and a rectangular base portion. The upstanding portion of thumb lock 44 extends through slot 45 in top plate 20 where it may be grasped by the operator and displaced the length of slot 45. The bottom portion of thumb lock 44 extends into slot 46 in lock plate 41 where it is held in a substantially fixed position. Therefore when the operator displaces thumb lock 44 in slot 45 lock plate 41 will be simultaneously displaced an equivalent distance.

Two pins 47 are mounted in center member 28 and extend into top plate 20 and bottom plate 31 to help maintain all three parts in fixed relationship to one another.

In operating the dispenser, a common commercial type of disc containing cartridge is positioned within each opening of top plate 20 as shown in FIG. 1. The cartridge may be of this type disclosed in U.S. Patent No. 3,119,521 issued to H. E. Taylor on Jan. 28, 1964, and manufactured by the Baltimore Biological Laboratory of Baltimore, Md. and distributed commercially under the name Sensi-Disc Cartridge is satisfactory for this invention. As depicted in FIG. 3 and FIG. 4, the cartridge extends through aligned openings in top plate 20, lock plate 41, center member 28 and dispensing plate 36. The bridge at the bottom of the cartridge fits in recess 49 of bottom plate 31 and is supported by bottom plate 31. The two longitudinally extending ribs on the outer surface of the cartridge fit onto corresponding longitudinal recesses in the openings in the dispenser thereby preventing the cartridge from being rotated and helping to maintain the cartridge in a fixed position. The cartridge is then in operational position and may be locked in place by means of thumb lock 44 and lock plate 41. Displacement of thumb lock 44 simultaneously causes lock plate 41 to partially close the opening through which cartridge 48 has entered thereby locking cartridge 48 within the dispenser.

Figure 6:
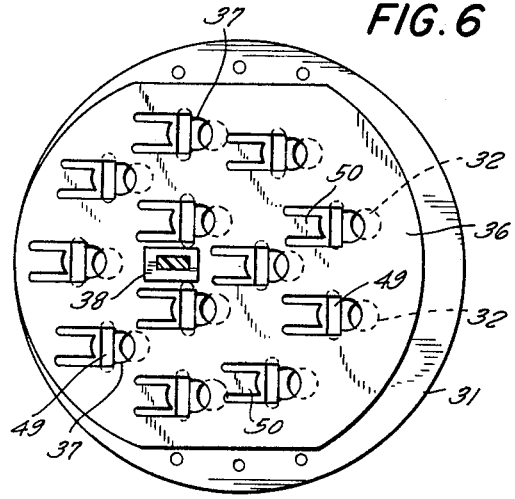
FIG. 6 is a top view of a dispensing plate of the sensitivity disc dispenser shown in position prior to dispensing.
Figure 7:
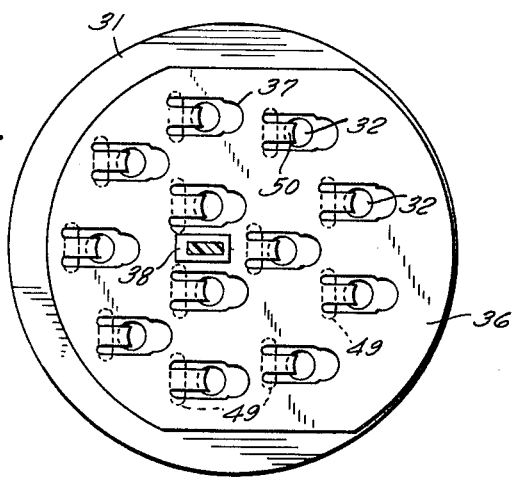
FIG. 7 is a top view thereof shown in position of which a disc is being dispensed.
Figure 8:
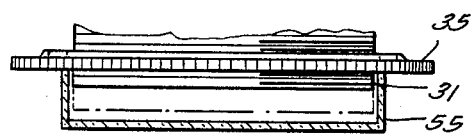
FIG. 8 is a fragmentary elevation view of the sensitivity disc dispenser associated with a petri dish.

When a disc is actually dispensed, the position of the elements immediately prior to dispensing is shown in FIG. 3 and the position of the elements immediately after dispensing is shown in FIG. 4. As can be seen, lower portion 27 of cam rod 24 will be depressed vertically downward due to the operators downward pressure on knob 25. This vertical action causes cam slide 38 to be displaced horizontally thereby displacing dispensing plate 36 horizontally. The horizontal motion of cam slide 38 and dispensing plate 36 stops when the vertical motion of cam rod 38 is restricted as annular shoulder 23a of knob 25 contacts the upper portion of support 22. As dispensing plate 36 is displaced horizontally its openings 37 will align themselves with openings 32 in bottom plate 31 and, simultaneously, a finger 50 adjacent to each opening 37 in dispensing plate 36 will displace a disc from each cartridge into opening 37 and through opening 32 in bottom plate 31 and into receiving dish 55 as seen in FIGS. 6 and 7. The openings in extension 34 are tapered slightly from top to bottom, being wider at the top to facilitate positive dispensing of a disc and narrower at the bottom to increase the accuracy of the pattern of discs dispensed. Recess 49 which receives the bridge at the bottom of cartridge 48 holds the bottom of the cartridge in a fixed position so that when finger 50 extends between the bridge and the bottom of the cartridge a disc positioned there will be positively dispensed. When the operator releases the downward pressure on knob 25, biasing spring 26 will force knob 25 and cam rod 24 back to its original position. The lower portion of cam rod 24 being at an angle will not pass through the opening in slide 38 when slide 38 has been restricted from horizontal motion by contact with the end of the recesses in parts 28 and 31 thereby retaining the elements of the dispenser in their original position. The return motion of cam rod 24 returns cam slide 38 and dispensing plate 36 to their original positions. The dispenser is then ready for subsequent dispensing operations.

Turning to the operation of tubular extension 34 and adjusting ring 35, it can be seen that adjusting ring 35 is provided with a knurled outer rim to facilitate its rotation. One side of adjusting ring 35 has a flat smooth surface and the other side has a pair of closely spaced annular shoulders 51 and 52, and three equally spaced radial ribs 51a extending between annular shoulders 51 and 52. These ribs provide a three point leveling contact with the rim of the dish and to decrease the probabality of any undesired excessive contact between the surfaces of the ring and the dish. The difference in the two surfaces allows adjusting ring 35 to be used with dishes having different types and sizes of upper peripheral rims as shown in FIG. 13 and FIG. 14. The threaded interengagement with tubular extension 34 of bottom plate 31 is not affected by inverting adjusting ring 35. In addition, by providing an additional part which fixes to the original adjusting ring, the dispenser can be used with many different size dishes. By providing a measured thread a predetermined amount of vertical adjustment can be accomplished by a single revolution of adjusting ring 35 in its threaded interengagement with tubular extension 34. By merely rotating adjusting ring 35 the height of tubular extension 34 above the medium within any petri dish or similar container can be exactly adjusted. A gap of 1.5 to 3 millimeters between the discharge ports and the culture medium has been found to produce satisfactory results. A thread may be provided so that, for instance, one revolution of the adjusting ring would be equal to 1 millimeter. This permits the operator to better control the free fall of the dispensed discs from the dispenser. Since the discs are extremely light in weight, they have a tendency to float when dropped from too great a height which would result in an inaccurate pattern. With this dispenser and its height adjustment, an exact pattern of discs may be obtained having centers an acceptable distance apart, as shown in FIG. 1. In addition, the positioning of tubular extension 34 within dish 55 and the resting of adjusting ring 35 on the upper peripheral lip of dish 55 provides an effective centering device to insure that the dispenser is properly centered with respect to dish 55 and further assure an exact or desired disc pattern to improve test results.

To operate this dispenser the operator need only depress knob 25 and is required to only use one hand to operate the dispenser which leaves his other hand free to perform another task simultaneously. The strength and rigidity of support 22 which houses cam rod 24 enables it to be used as a convenient carrying handle when transporting the dispenser. By limiting the displacement of the dispensing plate to the required distance for a proper discharge of a disc, the operator need not worry about depressing the plunger the required distance. Also by providing spring 26 to return the plunger and, consequently, the dispensing plate to its original starting position, the operator does not have to perform this function. All the operator is required to do is press the plunger as far as it will go and then release it. In all other respects the dispensing is done automatically and positively. These additional advantages contribute to providing a dispenser which may be used quickly and efficiently.

FIGS. 10–12 depict an alternate embodiment of this invention. The construction of adjusting ring 35' and tubular extension 34' is similar to that of the previously discussed embodiment. There are a plurality of holes in tubular extension 34 which are aligned with the discharge ports of the dispensing apparatus used. Adjusting ring 35' has a threaded inner diameter which engages with the threaded outer surface on tubular extension 34 so that it may be vertically adjusted. Together ring 35' and extension 34' combine to center the dispensing apparatus within a petri dish or similar container and the vertical adjustment of adjusting ring 35' will regulate the distance of free fall of discs dispensed. However, the structure of the dispensing apparatus is different. A conventional commercial type of dispensing apparatus is used, as for example, a dispenser of the type disclosed in U.S. Patent No. 2,947,444 issued to Taylor et al. on Aug. 2, 1960 and manufactured by Baltimore Biological Laboratory in Baltimore, Md. and available commercially under the name of Sensi-Disc Dispenser. Dispensing is accomplished by rotation of lever 53 which is attached to a dispensing plate having extending fingers which dispense discs from cartridges which may be the same type previously described. When the dispensing lever is rotated the extending fingers will displace a disc from each cartridge into alignment with the holes of extension 34'. The discs will fall through extension 34' and into the petri dish. The holes in extension 34' taper slightly to facilitate the dispensing of an acceptable pattern of discs, such as a pattern of discs having centers at least 24 millimeters apart. In this embodiment, the number of discs able to be dispensed at one time is eight while in the previous embodiment a total of 12 discs may be dispensed at the same time. By threading adjusting ring 35' on the outer surface of tubular extension 34' the height of the bottom of tubular extension 34' above the culture medium in any petri dish may be closely and accurately controlled. Therefore, the amount of free fall of discs dispensed from the dispenser will be held to a minimum. Consequently a more accurate and exact pattern of discs may be obtained with any given petri dish and culture medium. One side of adjusting ring 35' has two annular shoulders 51' and 52' and three equally spaced radial ribs 51a' extending therebetween. Shoulders 51' and 52' may be used to positively seat adjusting ring 35' on a number of types of petri dishes. The ribs provide a three point leveling contact with the rim of the dish and decrease the probability of any undesired excessive contact between the surfaces of the ring and the dish. The opposite side of adjusting ring 35' has a flat surface which is used to seat adjusting ring 35' on a number of other types of petri dishes or similar containers. This reversible feature of adjusting ring 35' adds to the versatility of the invention.

Thus, it will be evident that this invention provides a disc dispensing apparatus having a dispensing structure for housing a plurality of disc containing cartridges and having means for substantially simultaneously dispensing a disc from each cartridge through each one of a plurality of discharge ports. A tubular extension with openings aligned with the discharge ports extends vertically down from the dispensing apparatus and extends into a receiving dish. An adjusting ring is movably mounted on the outer surface of the tubular extension so that the height of the tubular extension above the bottom of the receiving dish may be adjusted to an optimum distance and the tubular extension and adjusting ring combination serves to center the dispensing apparatus within the receiving dish.

Thus the aforementioned objects and advantages are most effectively attained. Although several preferred embodiments of this invention have been disclosed in detail herein, it should be understood that this invention is in no sense limited thereby; and its scope is to be determined by that of the appended claims.

We claim:

1. A sensitivity disc dispenser comprising; a dispensing structure for housing a plurality of disc containing cartridges and having means for simultaneously dispensing a disc from each cartridge through each one of a plurality of discharge ports, adjusting means associated with said dispensing structure for adjusting the elevation of said dispensing structure above a receiving dish to facilitate the dispensing of a substantially accurate pattern of discs into said receiving dish, said adjusting means comprises; a tubular extension having a plurality of openings therethrough mounted on said supporting structure so that each opening is aligned with each discharge port and dispensed discs will pass therethrough, an adjusting ring movably mounted on said tubular extension and being adapted to be mounted on the upper peripheral rim of said receiving dish so that said tubular extension extends and is centered within said dish and when said adjusting ring is adjusted the distance between the tubular extension and the bottom of the dish will be adjusted accordingly to facilitate the dispensing of a substantially accurate pattern of discs into the dish, wherein each opening in said tubular extension is tapered slightly inwardly from top to bottom thereby providing closer control of the free fall of the dispensed discs.

2. The invention in accordance with claim 1 wherein said tubular extension has a threaded outer surface and said adjusting ring has a threaded inner surface to enable said ring to be movably adjusted with respect to said tubular extension.

3. The invention in accordance with claim 1 wherein the adjusting ring is adapted to receive an additional part for converting the adjusting ring for use with different size dishes.

4. The invention in accordance with claim 1 wherein the adjusting ring has one or more spaced annular shoulders extending from at least one surface thereof so as to form a groove between said shoulders in which to place a lip of said receiving dish thereby facilitating the retention of said dispenser in a fixed and centered position in relation to said receiving dish.

5. A sensitivity disc dispenser comprising; a dispensing structure for housing a plurality of disc containing cartridges and having means for simultaneously dispensing a disc from each cartridge through each one of a plurality of discharge ports, adjusting means associated with said dispensing structure for adjusting the elevation of said dispensing structure above a receiving dish to facilitate the dispensing of a substantially accurate pattern of discs into said receiving dish, said adjusting means comprises; a tubular extension having a plurality of openings therethrough mounted on said supporting structure so that each opening is aligned with each discharge port and dispensed discs will pass therethrough, an adjusting ring movably mounted on said tubular extension and being adapted to be mounted on the upper peripheral rim of said receiving dish so that said tubular extension extends and is centered within said dish and when said adjusting ring is adjusted the distance between the tubular extension and the bottom of the dish will be adjusted accordingly to facilitate the dispensing of a substantially accurate pattern of discs into the dish wherein the adjusting ring has one or more spaced annular shoulders extending from at least one surface thereof so as to form a groove between said shoulders in which to place a lip of said receiving dish thereby facilitating the retention of said dispenser in a fixed and centered position in relation to said receiving dish, wherein there are three equally spaced radial ribs extending between said shoulders so as to provide a three point leveling contact with the rim of said receiving dish.

6. A sensitivity disc dispenser comprising; a dispensing structure for housing a plurality of disc containing cartridges and having means for simultaneously dispensing a disc from each cartridge through each one of a plurality of discharge ports, adjusting means associated with dispensing structure for adjusting the elevation of said dispensing structure above a receiving dish to facilitate the dispensing of a substantially accurate pattern of discs into said receiving dish, said adjusting means comprises; a tubular extension having a plurality of openings therethrough mounted on said supporting structure so that each opening is aligned with each discharge port and dispensed discs will pass therethrough, an adjusting ring movably mounted on said tubular extension and being adapted to be mounted on the upper pepherl rim of said receiving dish so that said tubular extension extends and is centered within said dish and when said adjusting ring is adjusted the distance between the tubular extension and the bottom of the dish will be adjusted accordingly to facilitate the dispensing of a substantially accurate pattern of discs into the dish, wherein each opening in said tubular extension is angled slightly outwardly from top to bottom to facilitate the dispensing of a substantially accurate pattern of discs having the centers of adjacent discs approximately 24 millimeters apart.

7. A disc dispensing apparatus comprising; a supporting structure adapted to support a pair of vertically spaced plates, each formed with a series of openings, the individual openings in one plate being non-aligned with the openings in the other plate, a dispensing structure including a plate also formed with a series of openings substantially aligned with the openings of said one plate of said pair, means for supporting the plate of said dispensing means at a point intermediate the plates of said pair, a plunger connected to one of said structures and extending beyond all of said plates, a slide having an opening therein slidably mounted on said supporting structure in a first direction, said plunger slidably mounted in the opening of said slide in a second direction, said plunger being shaped so that when said plunger is displaced in the second direction said slide will be displaced in the first direction, said slide abutting said dispensing plate so that when said slide is displaced in the first direction it will shift said dispensing plate until the openings of said dispensing plate are aligned with the openings of said other plate of said pair, means for supporting disc containing cartridges within the openings of said one plate to maintain the position of the disc containing cartridges in a predetermined position with respect to said supporting structure so that when the plate of said dispensing structure is shifted and its openings aligned with the openings of said other plate a disc will be dispensed.

8. The invention in accordance with claim 7 wherein said plunger is movable in a substantially vertical direction and has its lower end extending at an angle to the vertical, said lower end slidably mounted in the opening of said slide in a substantially vertical direction, said slide slidably mounted on said supporting structure in a substantially horizontal direction so that when said plunger is vertically displaced said angled lower end will cause said slide to be horizontally displaced thereby horizontally shifting said dispensing plate to align its openings with openings of said other plate of said pair.

9. The invention in accordance with claim 7 wherein said plunger is of sufficient rigidity so as to enable it to be used as a carrying handle for the dispenser.

10. The invention in accordance with claim 7 wherein locking means are provided to retain said disc containing cartridges within said dispenser.

11. The invention in accordance with claim 7 wherein means are provided to prevent said plunger from being displaced more than a predetermined distance so that the operator need only displace the plunger to its limit and one layer of discs will be positively dispensed.

12. The invention in accordance with claim 7 wherein there are twelve openings in each plate of said disc dispensing apparatus so that a layer of twelve discs may be dispensed substantially simultaneously.

13. The invention in accordance with claim 7 wherein biasing means are provided to return said plunger to its starting position when it is released and thereby realign the openings in said dispensing plate with the openings in said one plate of said pair.

14. The invention in accordance with claim 13 wherein said biasing means is a spring.

15. Adjusting apparatus for use with a sensitivity disc dispenser for adjusting the elevation of said dispenser above a receiving dish to facilitate the dispensing of a substantially accurate pattern of discs into said receiving dish comprising; means to attach said adjusting apparatus to said dispenser, surfaces on said adjusting apparatus for resting the dispenser on the upper peripheral rim of said receiving dish, said adjusting apparatus being shaped so that said dispenser is adapted to be centered within said receiving dish, means for adjusting the elevation of said dispenser above said receiving dish to a desired height wherein said tubular extension has a threaded outer surface and said adjusting ring has a threaded inner surface to enable said ring to be movably adjusted with respect to said tubular extension.

16. The invention in accordance with claim 15 wherein the adjusting ring is adapted to receive an additional part for converting the adjusting ring for use with different size dishes.

17. The invention in accordance with claim 15 wherein the adjusting ring has one or more spaced annular shoulders extending from at least one surface thereof so as to form a groove between said shoulders in which to place a lip of said receiving dish thereby facilitating the retention of said dispenser in a fixed and centered position in relation to said receiving dish.

18. Adjusting apparatus for use with a sensitivity disc dispenser for adjusting the elevation of said dispenser above a receiving dish to facilitate the dispensing of a substantially accurate pattern of discs into said receiving dish comprising; means to attach said adjusting apparatus to said dispenser, surfaces on said adjusting apparatus for resting the dispenser on the upper peripheral rim of said receiving dish, said adjusting apparatus being shaped so that said dispenser is adapted to be centered within said receiving dish, means for adjusting the elevation of said dispenser above said receiving dish to a desired height, wherein the adjusting ring has one or more spaced annular shoulders extending from at least one surface thereof so as to form a groove between said shoulders in which to place a lip of said receiving dish thereby facilitating the retention of said dispenser in a fixed and centered position in relation to said receiving dish, wherein there are three equally spaced radial ribs extending between said shoulders so as to provide a three point levelling contact with the rim of said receiving dish.

19. Adjusting apparatus for use with a sensitivity disc dispenser for adjusting the elevation of said dispenser above a receiving dish to facilitate the dispensing of a substantially accurate pattern of discs into said receiving dish comprising; means to attach said adjusting apparatus to said dispenser, surfaces on said adjusting apparatus for resting the dispenser on the upper peripheral rim of said receiving dish, said adjusting apparatus being shaped so that said dispenser is adapted to be centered within said receiving dish, means for adjusting the elevation of said dispenser above said receiving dish to a desired height, wherein each opening in said tubular extension is tapered slightly inwardly from top to bottom thereby providing closer control of the free fall of the dispensed discs.

20. Adjusting apparatus for use with a sensitivity disc dispenser for adjusting the elevation of said dispenser above a receiving dish to facilitate the dispensing of a substantially accurate pattern of discs into said receiving dish comprising; means to attach said adjusting apparatus to said dispenser, surfaces on said adjusting apparatus for resting the dispenser on the upper peripheral rim of said receiving dish, said adjusting apparatus being shaped so that said dispenser is adapted to be centered within said receiving dish, means for adjusting the elevation of said dispenser above said receiving dish to a desired height, wherein each opening in said tubular extension is angled slightly outwardly from top to bottom to facilitate the dispensing of a substantially accurate pattern of discs having the centers of adjacent discs approximately 24 millimeters apart.

References Cited
UNITED STATES PATENTS

| | | | |
|---|---|---|---|
| 879,133 | 2/1908 | Davis | 141—368 |
| 1,771,218 | 7/1930 | Heerdt | 141—368 |
| 2,865,156 | 12/1958 | Wolfson | 221—93 XR |
| 2,947,444 | 8/1960 | Taylor et al. | 133—4 XR |
| 3,300,087 | 1/1967 | Kuypers | 221—197 XR |

WALTER SOBIN, *Primary Examiner.*